US006594232B1

(12) United States Patent
Dupont

(10) Patent No.: US 6,594,232 B1
(45) Date of Patent: Jul. 15, 2003

(54) TRANSMITTER-BASED PATH PROTECTION SWITCHING IN A RING NETWORK

(75) Inventor: Jean-Lou Dupont, Kirkland (CA)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/324,244

(22) Filed: Jun. 2, 1999

(51) Int. Cl.[7] .............................................. H04L 12/437
(52) U.S. Cl. ........................................ 370/224; 370/222
(58) Field of Search ................................ 370/222, 223, 370/224, 216

(56) References Cited

U.S. PATENT DOCUMENTS

| | | |
|---|---|---|
| 4,538,026 A | 8/1985 | Yasue |
| 4,633,246 A | 12/1986 | Jones et al. |
| 4,646,286 A | 2/1987 | Reid et al. |
| 4,837,760 A | 6/1989 | Reid et al. |
| 5,029,158 A | 7/1991 | Reid et al. |
| 5,528,580 A * | 6/1996 | Lee et al. |
| 5,572,513 A | 11/1996 | Yamamoto et al. |
| 5,754,528 A | 5/1998 | Uchida |
| 5,757,774 A * | 5/1998 | Oka ............................ 370/242 |
| 5,790,520 A | 8/1998 | Iwamoto et al. |
| 5,793,745 A | 8/1998 | Manchester |
| 5,838,724 A | 11/1998 | Cole et al. |
| 5,872,780 A | 2/1999 | Demiray et al. |
| 6,226,111 B1 * | 5/2001 | Chang et al. ............. 359/119 |
| 6,295,146 B1 * | 9/2001 | Nathan et al. ............ 359/119 |
| 6,396,852 B1 * | 5/2002 | Simmons ................... 370/535 |
| 6,430,700 B1 * | 8/2002 | Daruwalla et al. ............ 714/4 |

OTHER PUBLICATIONS

Yoshio Kajiyama et al: "ATM Self–Healing Ring", Proceedings of the Global Telecommunications Conference (Globecom), New York, IEEE, Dec. 6, 1992, pp. 639–643.

* cited by examiner

Primary Examiner—Ken Vanderpuye
(74) Attorney, Agent, or Firm—Jones Day

(57) ABSTRACT

A system and method for path protection switching in ring networks is provided in which the path protection switch occurs at the transmitter node that initiated a particular virtual channel of data packets onto the ring network. A failure in one of the data communication-paths of the ring network is detected by the network nodes on either side of the failure. These network nodes then initiate a wrap mechanism that embeds a special feedback wrap indicator flag into packets received at the two nodes, and then wraps (or transmits back) these packets (with the feedback indicator) in the opposite direction towards the transmitter node that initiated the packets onto the ring. Each transmitter node detects whether received packets are associated with virtual channels that it initiated onto the ring and if so detected, then determine whether the feedback indicator flag is set. If so, then a protection switch occurs at the transmitter node so that additional packets associated with the particular virtual channel are switched in a direction opposite to the failure. A ring continuity mechanism is used to determine when to revert the transmitter nodes back to their prior operating state, and a garbage collection function is also included.

16 Claims, 5 Drawing Sheets

TRANSMITTER-BASED PATH PROTECTION SWITCHING IN A RING NETWORK

BACKGROUND OF THE INVENTION

1. Technical Field

The present invention is directed to the field of data communication networks. More particularly, the present invention provides a system and method for path protection switching in a ring network.

2. Description of the Related Art

Ring networks are well known in the data communication art. Typical ring systems include Fiber Distributed Digital Interface ("FDDI") rings, token-ring structures, and more recently Synchronous Optical Network ("SONET") rings. A ring network typically includes a plurality of network nodes coupled together by one or more data communication channels (or paths). These network nodes may, in turn, couple to local nodes or networks, or may couple to other ring structures.

In a SONET network, the network nodes are logically connected by a plurality of virtual paths that coexist on the one or more physical network connections that couple the nodes. Each virtual path may include a plurality of virtual channels, wherein each virtual channel transports packets (or cells) that are formatted according to the SONET standard format, which is known as the Synchronous Payload Envelope ("SPE"). The SPE further defines the data cells as overhead and payload sections. Overhead information is used to maintain the operation and maintenance of the network, whereas payload information represents the deliverable information of the system being transported in the particular virtual channel. The physical network connection spanning the network nodes may include one or more fiber optic connections. In some network topologies, a single fiber carries payload information in both directions around the ring, whereas in others there is one fiber for one sense of direction, and another fiber for the other sense of direction. In a SONET ring network these two senses of direction are typically referred to as the east and west directions of the ring.

One important concept in ring network design is path protection switching. Path protection switching involves sensing when a fault has occured on the ring network and routing data traffic to accomodate the faulty connection. In some ring systems, a separate path protection channel or connection is provided so that if the main data path is severed (or otherwise inoperative), the system switches traffic onto theprotection channel. However, these systems require a separate physical channel between the network nodes, as well as additional hardware to support the path protection channel. Moreover, if the path protection wire (or fiber) is physically routed in proximity to the main connection between the nodes (as is common), then A fault (such as a fiber cut of the main connection from a back-hoe or other heavy machinery) will likely result in the path protection channel being faulty as well.

Another type of path protection switching known as receiver-based protection switching does not involve a separate path protection line as in the system described above, but rather includes special switching circuitry at the receiver of each network node, which is utilized to avoid the faulty path. This type of path protection switching is commonly implemented in SONET Unidirectional Path Switched Rings ("UPSR"). A UPSR typically utilizes two optical fibers, one for transporting data in one direction around the ring, and a second for transporting data in the other direction around the ring. FIG. 1, discussed in more detail below, sets forth such a SONET UPSR network.

In a receiver-based path protection switching system, two identical payload streams (data streams) are transmitted along two separate virtual paths connecting two network nodes—the transmitter node and the receiver node. The two paths represent the two directions of transmission from one node to the next, i.e., "east" and "west." Operationally, the transmitter of a particular virtual channel launches two identical payload streams in either direction (east and west) towards the receiver node. The receiver node receives the two payload streams, compares their relative transmission quality, and switches from one stream to the other (at the receiver node) based on this comparison.

The main problems with this type of path protection scheme are: (1) it is wasteful of bandwidth since it requires doubling the amount of data necessary to transport useful information on the ring network; (2) switching time in response to a fault is relatively slow; and (3) it requires relatively complex circuitry on both the transmitter and receiver sides of the virtual path in order to manage the dual transmissions.

SUMMARY OF THE INVENTION

A system and method for path protection switching in ring networks is provided in which the path protection switch occurs at the transmitter node that initiated a particular virtual channel of data packets onto the ring network. A failure in one of the data communication paths of the ring network is detected by the network nodes on either side of the failure. These network nodes then initiate a wrap mechanism that embeds a special feedback wrap indicator flag into packets that are received at the two nodes, and then wraps (or transmits back) these packets (with the feedback indicator) back in the opposite direction towards the transmitter node that initiated the packets onto the ring. Each transmitter node detects whether received packets are associated with virtual channels that it initiated onto the ring, and if so detected, then determine whether the feedback indicator flag is set. If so, then a protection switch occurs at the transmitter node so that additional packets associated with the particular virtual channel are switched in a direction opposite to the failure. A ring continuity mechanism is used to determine when to revert the transmitter nodes back to their prior operating state, and a garbage collection function is also included.

According to one aspect of the invention a method of path protection switching in a ring network is provided. The ring network includes a plurality of network nodes coupled together by one or more data communication paths. The method includes the steps of (1) detecting a faulty condition between two of the network nodes in the ring network; (2) engaging a wrap mechanism at the two network nodes where the faulty condition is detected in order to wrap data packets received at these nodes away from the faulty condition and back towards the transmitter network node that initially transmitted the data packets onto the ring network; (3) detecting the wrapped packets at the transmitter network node; and (4) engaging a path protection switch at the transmitter network node that switches additional packets away from the faulty condition.

According to another aspect of the invention, a method of path protection switching in a ring network, comprising the steps of: detecting a failure at a first network node in the ring network; setting a forward wrap notification indicator in the overhead section of each packet received at the first network node; wrapping the received packets away from the failure and back towards a second network node that initiated the packets onto the ring network; detecting the wrapped packets at the second network node; and switching the transmitter of the second network node so that additional packets are transmitted away from the first network node where the failure exists.

Still another aspect of the invention provides a system for path protection switching in a ring network, the system including: (A) a detector in each of two network nodes for detecting a faulty condition between the nodes; (B) a wrap controller in each of the two network nodes for engaging a wrap mechanism when the faulty condition is detected in order to wrap data packets received at these nodes away from the faulty condition and back towards a transmitter network node that initially transmitted the data packets onto the ring network; (C) a detector at the transmitter network node for detecting the wrapped packets; and (D) a path protection controller at the transmitter network node that switches additional packets away from the faulty condition.

Yet another aspect of the invention provides a method of garbage collection in a ring network, comprising the steps of: (a) detecting an anomalous condition between two nodes in the ring network; (b) if an anomaly is detected, then setting a wrap indicator flag in packets received at the two nodes and wrapping those packets away from the anomaly; and (c) if a packet having a wrap indicator flag set is received at a node that is wrapping packets away from an anomaly, then discarding those received packets.

It should be noted that these are just some of the many aspects of the present invention. Other aspects not specified will become apparent upon reading the detailed description set forth below.

The present invention overcomes the disadvantages of presently known path protection systems and methods and also provides many advantages, such as: (1) optimized for ring structures; (2) does not waste system bandwidth, as in the receiver-based systems; (3) provides fast protection switching; (4) low cost and low complexity; and (5) easily integrates with existing network node devices (such as a SONET add-drop multiplexer).

These are just a few of the many advantages of the present invention, which is described in more detail below in terms of the preferred embodiments. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the general need noted above and provides many advantages, as will become apparent from the following description when read in conjunction with the accompanying drawings, wherein.

DETAILED DESCRIPTION OF THE DRAWINGS

Figures 1, 2:
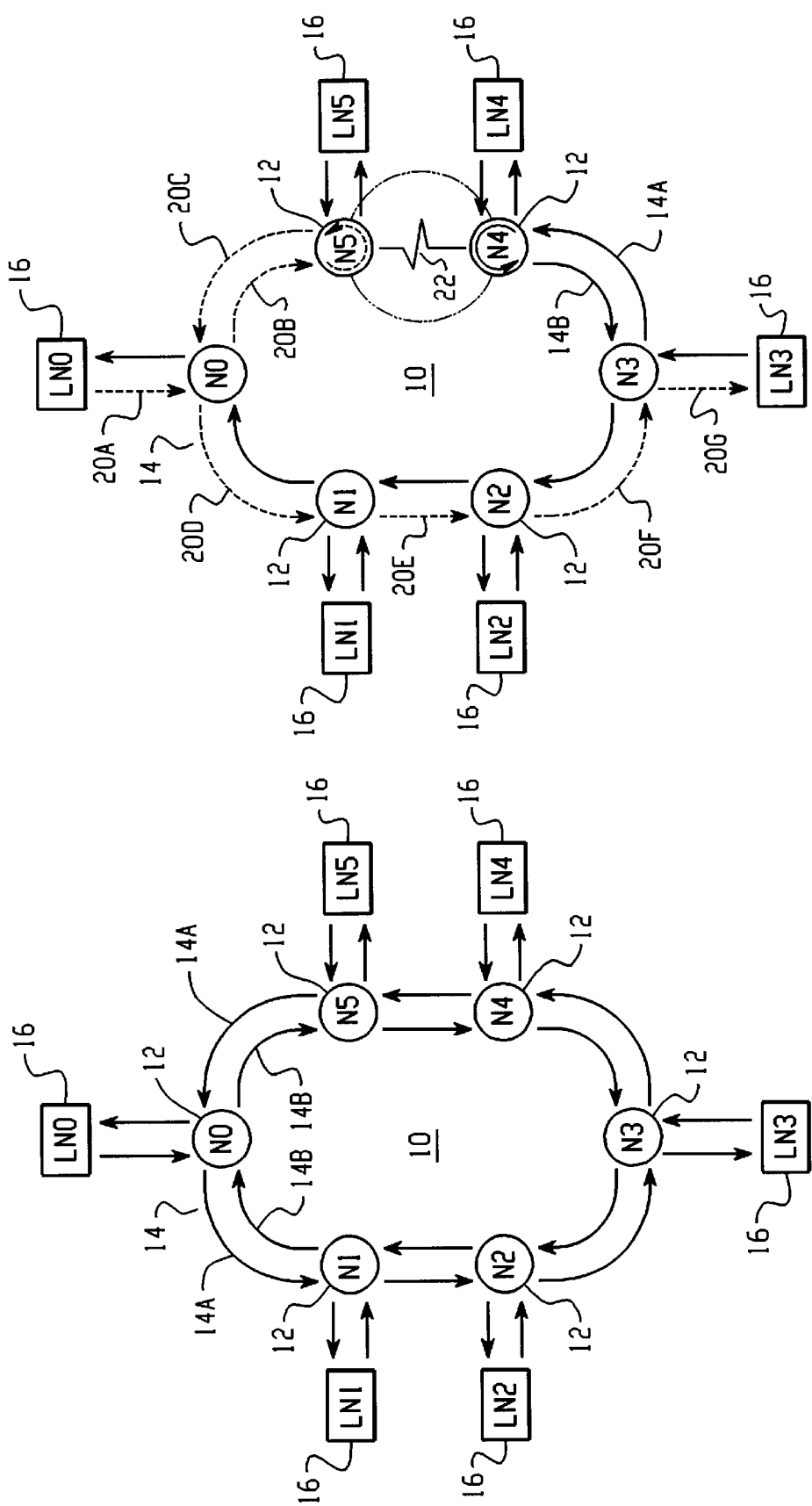
FIG. 1 is a block diagram of a ring network, such as a SONET UPSR, which may include the system and method of the present invention.
FIG. 2 is a block diagram of then ring network shown in FIG. 1 in which a fault has occurred between two of the network nodes in the system.

Turning now to the drawing figures, FIG. 1 sets forth a system diagram of a ring network 10, such as a SONET UPSR network, which could incorporate the transmitter-based path switching functionality of the present invention. The ring network 10 includes a plurality of network nodes 12, labeled N0–N5, coupled in a ring structure by one or more communication paths 14A, 14B. As shown in FIG. 1, the two paths 14A, 14B transport SONET data streams (many packets/cells) in opposite directions about the ring (i.e., east and west). The communication paths 14A, 14B are preferably fiber optic connections (in SONET), but could, alternatively be electrical paths or even wireless connections (in other types of ring networks). In the case of a fiber optic connection, paths 14A, 14B could be implemented on a single fiber 14, dual fibers 14A, 14B, or some other combination of connections.

Each network node 12 is preferably coupled to two other network nodes 12 in the ring structure 10. For example, network node N0 is coupled to network nodes N1 and N5. The coupling between the nodes in FIG. 1 is two-way, meaning that each node 12 transmits and receives data (packets/cells) to and from each of the two other nodes 12 it is connected to. Each network node 12 includes at least two transmitter/receiver interfaces, one for each connection to another node 12. The network nodes 12 could be many types of well-known network devices, such as add-drop multiplexers ("ADMs"); switches, routers, cross-connects or other types of devices. The devices 12 shown in FIG. 1 are preferably ADMs. These ADMs 12 are coupled to local nodes 16, and are used to add packets/cells from the local nodes 16 to the SONET data stream, and conversely to drop packets from the SONET data stream to the local nodes 16.

In such a SONET ring network 10, the network nodes 12 are logically connected by a plurality of virtual paths that coexist on the physical network connection(s) 14. Virtual paths are also known as logical paths or "pipes." For example, although there is only one physical connection from node N0 to node N1 to node N2, there may be numerous virtual paths between these nodes, such as one virtual path from N0 to N1, another from N0 to N2 and another from N1 to N2. Each virtual path may include a plurality of virtual channels, wherein each virtual channel transports packets (or cells) formatted according to the SONET SPE. For more information on SONET formats, line-speeds, and theory of operation, see John Bellamy, *Digital Telephony*, 2d Edition (1991), pp. 403–425.

FIG. 2 sets forth a block diagram of the ring network 10 shown in FIG. 1 in which a fault 22 has occurred between two of the network nodes 12 in the system (N5 and N4). This is an example of a situation where a path protection mechanism could be triggered in the system in order to prevent additional data packets from being transmitted towards the faulty connection 22, and thus making the system more efficient.

In the present invention, there are three stages to the path protection function. First, a failure (or anomaly) is detected at the two nodes 12 that are associated with the failed path, and a "wrap" mechanism is initiated at each of these nodes in order to reroute packets away from the fault 22. At the same time that the wrap mechanism is initiated, the two nodes that are wrapping packets also embed a feedback indicator into the wrapped packets to indicate that a failure has occurred at that node, and that the packets have been wrapped back towards the node that initiated the packet. Second, for each virtual channel that has been wrapped, its associated transmitter node detects the returning packets associated with the wrapped virtual channel and initiates a protection switch so that additional local packets that are added to the virtual channel are not transmitted towards the fault, but instead are transmitted in the other direction around the ring. Third, once the failure has been corrected the system returns to normal operation using the ring continuity function.

The wrap mechanism is shown graphically in FIG. 2, and its specifics are described in more detail in connection with FIGS. 3, 4 and 5. The transmitter-based path switching function is shown in FIG. 4, and the ring continuity function is described in FIG. 6.

Turning back to FIG. 2, an anomaly (or faulty condition) 22 is shown in the connections between network nodes N5 and N4 of the ring network 10. This faulty condition 22 could be a line-cut (such as when a fiber optic cable is severed during a digging operation), a degradation in signal level between the nodes, or a degradation in signal quality (such as a rise in bit-error rate). In any event, the network nodes 12 of the present invention may be programmed to react to many different types of anomalies. Once the fault is detected, the nodes 12 are programmed (via the virtual path controller described below) to "wrap" received packets/cells away from the anomaly 22 by sending them back towards the transmitting node where they originated and ultimately to their destination node on the other side of the fault.

Consider the example data stream flow shown in FIG. 2 (20A–20G). In this example, data packets from local node LN0 (coupled to network node N0) are destined for local node LN3 (coupled to network node N3). Initially (prior to the anomaly) node N0 transmits the packets from LN0 in a clockwise (or easterly) direction about the ring 10 towards N3. But then a fault 22 occurs between nodes N5 and N4 disabling communications along this sub-path of the ring. The system and method of the present invention detects the anomaly at nodes N5 and N4 and initiates a wrap function at these nodes so that any incoming packets that are not being dropped to the respective local connections (i.e. "through" packets) are redirected back in the opposite direction. In this manner, the packets/cells received at N5 from N0 are redirected back to N0 along path 20C, and then to N1, N2 and N3 along paths 20D, 20E and 20F, where they are dropped from the SONET ring to local node LN3 along path 20G.

As described in more detail below, the present invention further includes embedded signaling bits in the wrapped packets/cells that trigger a protection switch at the transmitter where the packets/cells originated. For example, when the wrapped packets from N5 return to N0, the embedded signaling bits for the particular virtual channel are detected at N0, which then engages a path protection switching function that switches additional packets from LN0 away from the faulty condition 22 and in the opposite direction of transmission.

Figure 3:
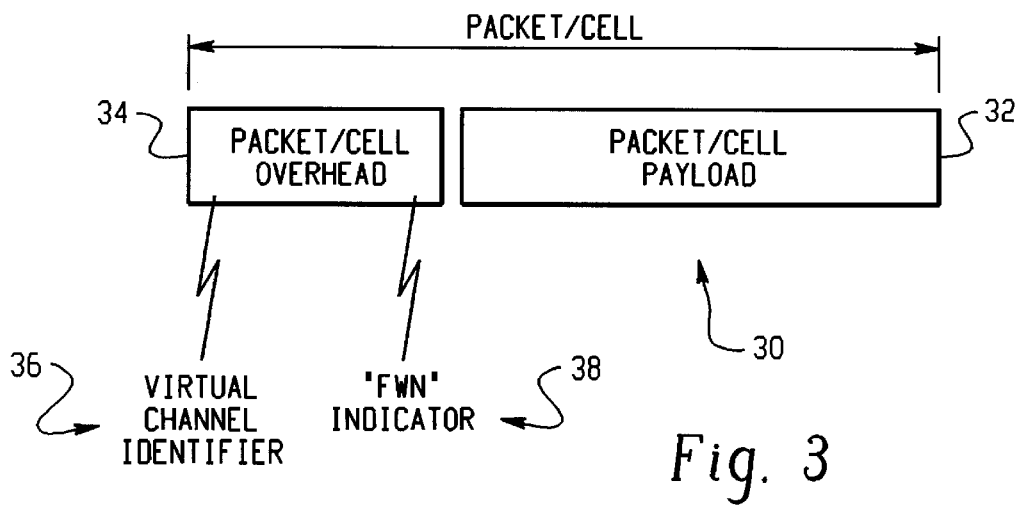
FIG. 3 is a preferred packet/cell map according to the present invention including an overhead section and a payload section, in which special signaling identifiers are embedded into the overhead section of the packet to facilitate path protection switching at a transmitter node.
Figure 4:
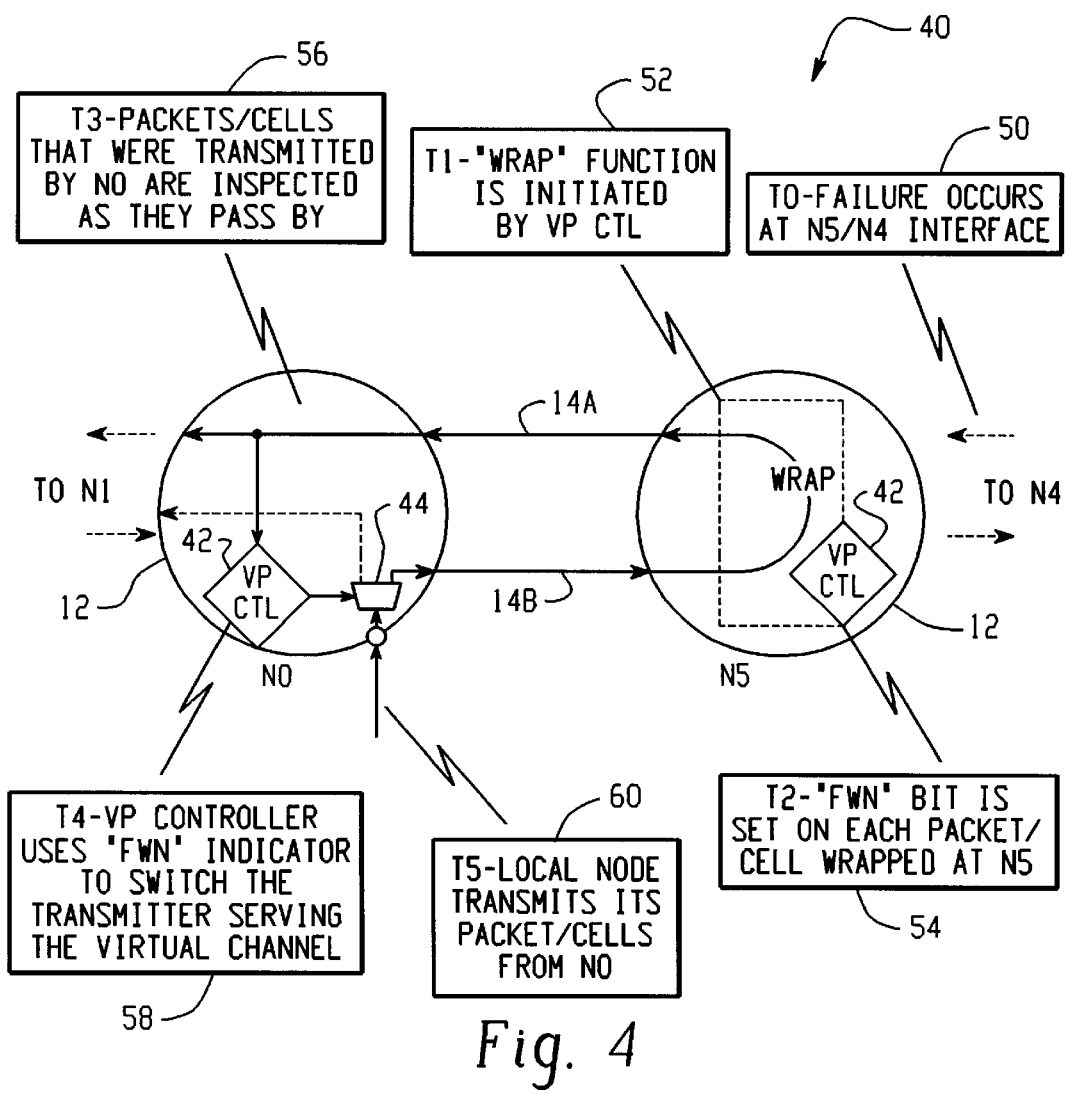
FIG. 4 is a diagram of two network nodes showing the preferred wrap mechanism, and the preferred transmitter-based path protection switching function of the present invention.

FIG. 3 is a preferred packet/cell map 30 according to the present invention including a payload section 32 and an overhead section 34, in which special signaling identifiers (or indicators) 36, 38 are embedded into the overhead section 34 of the packet to facilitate path protection switching at the transmitter node. The packet/cell may be formatted according to the SONET SPE structure, in the case of a SONET ring network, or it may be formatted according to another framing structure having payload and overhead sections in the case of other types of ring networks. As noted above, the payload contains the useful information being transported on the network, and the overhead typically includes operations and maintenance information that is used by the network to facilitate packet transport.

In the present invention, the two signaling identifiers embedded into the overhead section of the packet/cell facilitate path protection switching at the transmitter node of a particular virtual channel. These two identifiers are the virtual channel identifier 36 (or "VCI"), and the forward wrap notification indicator 38 (or "FWN"). The VCI 36 is preferably a multi-bit signal that identifies the transmitter node that launched the packet onto the ring network 10 as well as the particular virtual channel that the packet is associated with. This later identification is necessary since a transmitter for a particular network node 12, such as node N0, could have multiple virtual channels associated with it, and each of these virtual channels may need to be individually path protection switched. The FWN indicator 38 is preferably a single-bit that indicates whether or not this packet/cell has been wrapped around a failure. The VCI indicator 36 is embedded into the packet/cell overhead 34 by the transmitter that launched the particular virtual channel onto the network, whereas the FWN indicator 38 is set at the receiver node 12 where the wrap occurs.

Figure 8:
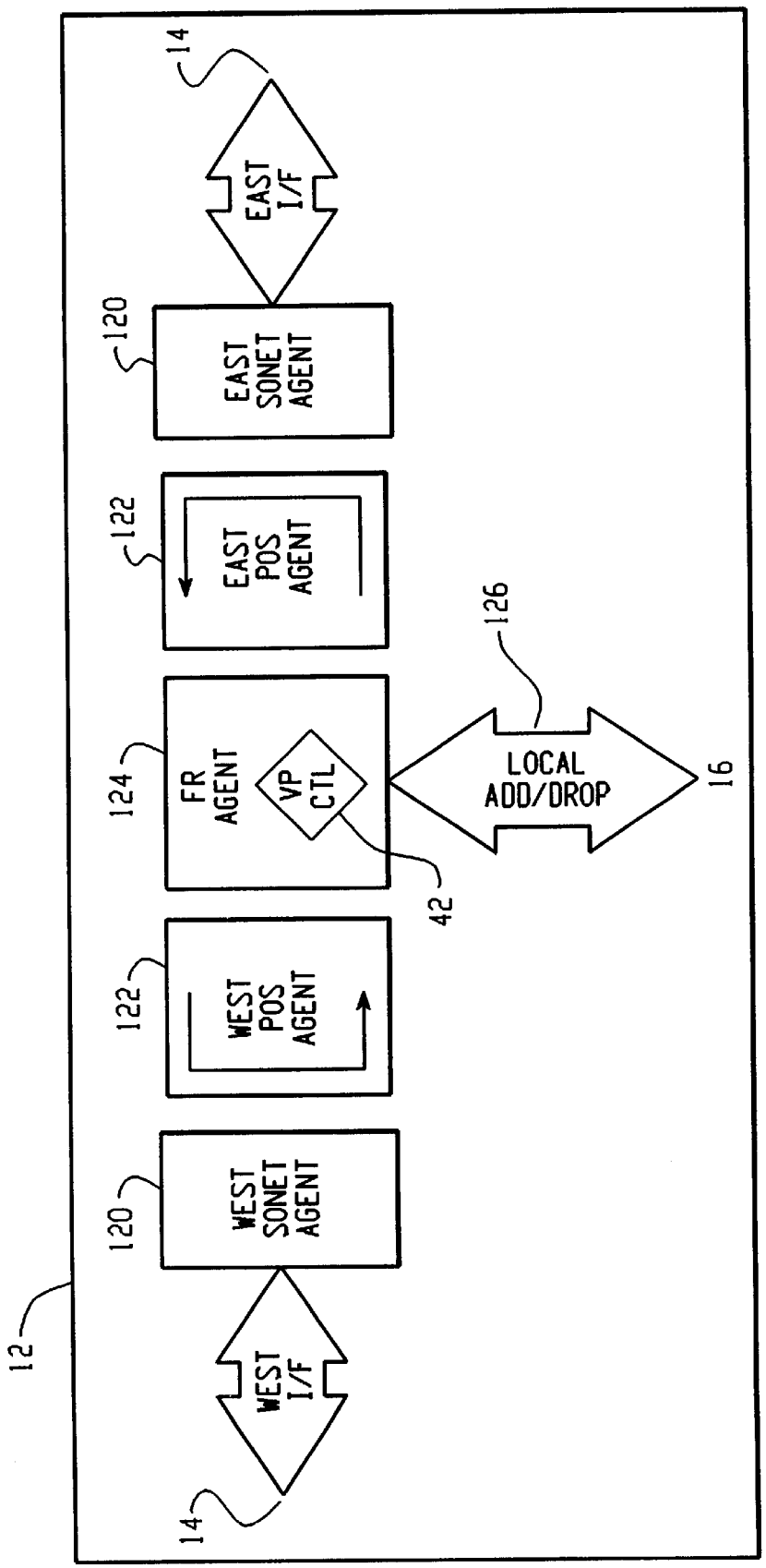
FIG. 8 is a block diagram showing several elements of a preferred SONET add-drop multiplexer incorporating the transmitter-based path protection functionality of the present invention.

FIG. 4 is a diagram of two network nodes 12 showing the preferred wrap mechanism, and the preferred transmitter-based path protection switching function of the present invention. The two network nodes 12 in this figure correspond to nodes N0 and N5 shown in FIGS. 1 and 2. These nodes 12 are preferably ADM elements that add, drop and multiplex packets/cells from respective local nodes into a plurality of virtual paths/channels that span the ring network 10. Each ADM 12 is preferably configured as shown in FIG. 8 (described below), although other configurations are certainly possible. The network nodes 12 include east and west transmitter/receiver interface circuits for transmitting and receiving packets/cells from the two other nodes to which it is connected. For example, network node N0 includes an east transmitter/receiver interface for sending and receiving packets/cells to node N5, and a west transmitter/receiver interface for sending and receiving packets/cells to node N1. A virtual path controller circuit ("VP CTL") 42 and a local switch 44 are also included in each node 12. These additional elements facilitate the path protection switching function at the transmitter node.

Consider first the situation where a fault has not occurred in the ring and local traffic from LN0 is being added to the packet stream by network node N0 for transmission to local node LN4 coupled to network node N4. In this situation, packets from LN0 are received at N0 and switched 44 towards node N5 via data path 14B. Since these packets are destined for node N4, they are normally passed-through node N5 and re-transmitted onto the data path between nodes N5 and N4.

Now assume that at time T0 (50) a failure occurs at the node N5/N4 interface. The failure could be a line-cut in the fiber optic cable coupling the two nodes, or it could be some degradation in the signal level or quality of the transmission. In any event, the VP CTL circuit 42 in node N5 determines that an anomaly has occurred in the path between itself and node N4 and declares a failure. When this occurs, the wrap function is initiated 52 at node N5. In the same manner, the VP CTL 42 in node N4 also detects the anomaly and initiates a wrap function.

As described above, the wrap function causes pass-through packets received at node N5 to be transmitted back to node N0 with the FWN indicator flag 38 set 54 to indicate that the packets associated with the particular virtual channel have been wrapped. Those packets that are to be dropped by node N5 (i.e. packets that are destined for local node LN5) are not wrapped, but simply dropped out of the SONET data stream. This is the first stage of path protection switching in the invention—at time T0 the failure occurs 50, at time T1 the failure is detected by the virtual path controller 42 and the wrap function is initiated 52, and at time T2 the FWN bit 38 is set on each packet/cell wrapped by the particular network node 12.

Figure 5:
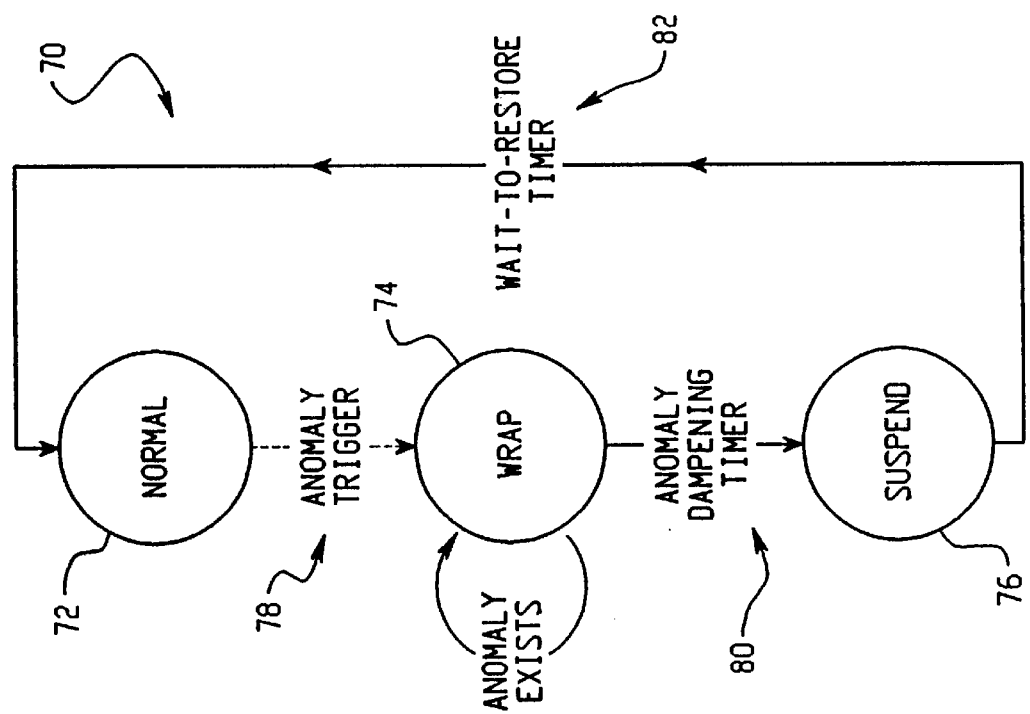
FIG. 5 is a preferred state transition diagram of the wrap mechanism.

FIG. 5 sets forth a state transition diagram 70 of the preferred wrap mechanism. Initially, each node 12 is in the normal state 72, which means that there are no faults or anomalies on either the eastbound or westbound transmitter/receiver interfaces of the node 12. When a fault occurs, however, such as a line sever or a loss in performance of the link, an anomaly trigger is generated (usually by a lower level protocol agent) and detected by the VP CTL circuit 42 of the two nodes on either side of the faulty condition. The nodes 12 then enter the wrap state 74, where incoming through-packets are being wrapped away from the faulty connection, and the FWN indicator bits 38 are being set in each virtual channel that is being rerouted. As long as the anomaly persists, the nodes will remain in the wrap state 74. Once the anomaly has been cleared, an anomaly dampening timer 80 is set in each node. The purpose of this delay timer 80 is to prevent oscillations or transients in the data stream that could result if the wrapping function was discontinued immediately after the fault was corrected. In the preferred SONET ADM ring system 10 shown in the drawings, the anomaly dampening timer typically is set to several minutes, although other times are certainly possible, and indeed the dampening timer is an optional feature of the invention. During the period where the anomaly dampening timer is operating, packets/cells are continually being wrapped away from the node even though the anomaly has been cleared. If the anomaly reappears during this time period, then the nodes 12 re-enter the wrap state 74.

Once the dampening timer 80 has expired, the nodes enter the suspend state 76. In this state, the wrap function has been suspended, but the system is not yet ready to return to the normal mode of operation. While in the suspend state 76, a wait-to-restore timer 82 delays for a predetermined period of time. The purpose of this timer is to permit the transmitter nodes to revert to their normal condition (assuming the transmitters are provisioned for revertiveness). Like the anomaly dampening timer 80, the purpose of the wait-to-restore timer 82 is to prevent transients in the ring network 10.

Turning back to FIG. 4, the wrapped packets with the embedded feedback information are then transmitted back towards node N0 on data path 14A. This leads to the second stage of path protection switching in the invention. At time T3, as the wrapped packets are received by node N0, the virtual path controller 42 in node N0 inspects the incoming packets for two pieces of information—first, it examines the virtual channel identifier (VCI) 36 to determine whether a particular packet was initiated onto the ring network by this node. Since the VCI 36 uniquely identifies the transmitting node for a particular virtual channel and the virtual channel itself, by examining this field each node 12 can determine which packets it initially transmitted onto the network. If the VP CTL circuit 42 determines that a particular packet was initiated onto the network by that node, then it examines the FWN indicator bit 38 to determine if the packet has been wrapped by some other node. If so, then at time T4, the VP CTL 42 signals the switch 44 to engage the path protection function for the particular virtual channel.

Having received at least one packet for the particular virtual channel with the FWN bit set, the VP CTL circuit 42 latches the switch 44 so that additional packets/cells associated with this virtual channel received from local node LN0 are switched towards network node N1 and away from the fault at network node N5. This is the second stage of path protection switching in the invention—at time T3 data packets/cells are inspected to determine if they were initiated onto the ring by this node, and whether they have been wrapped by another node 56, at time T4 the VP CTL circuit 42 latches the local switch 44 if the packet is associated with a virtual channel initiated by this node, and if the FWN indicator 38 is set 58, and at time T5 additional packets received by node N0 are switched away from the fault.

In the same manner, each of the nodes 12 in the network inspects incoming packets from other nodes to determine: (a) if the packets are associated with a virtual channel initiated by this node; and (b) if a wrap has been initiated by another node. If these two conditions are met, then the VP CTL circuit 42 of the particular node that initiated the virtual channel latches its local switch 44 to route additional packets associated with the particular virtual channel away from the fault. The final stage of the path protection switching mechanism of the present invention—restoring the network to normal operating condition—utilizes the ring continuity mechanism described below.

Figure 6:
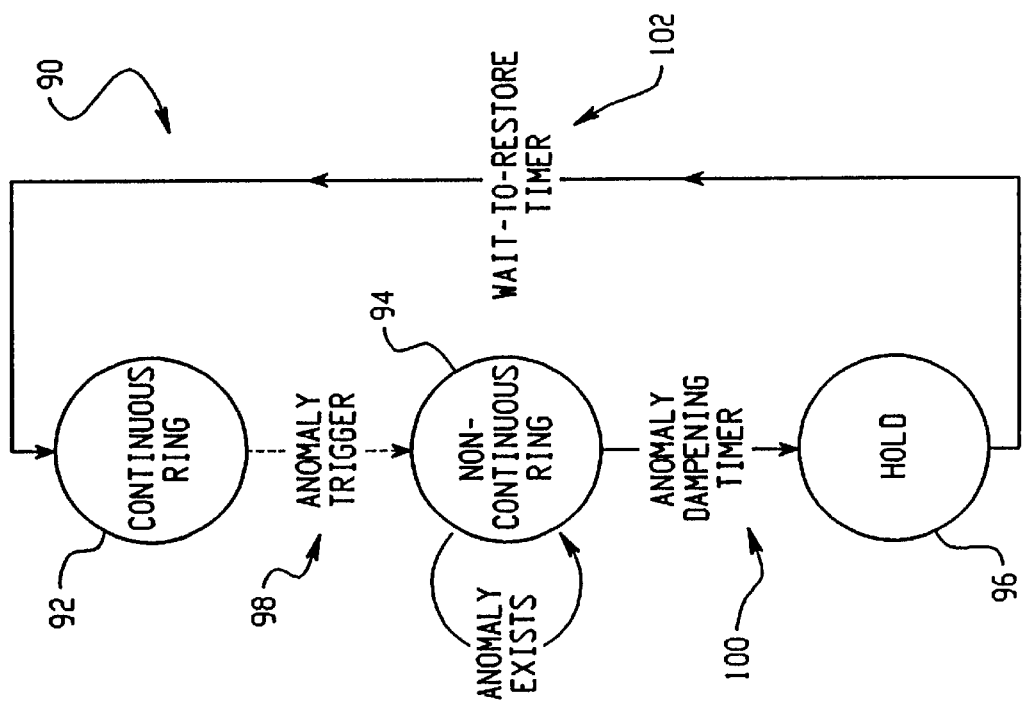
FIG. 6 is a preferred state transition diagram of the ring continuity mechanism of the present invention.

FIG. 6 is a preferred state transition diagram 90 of the ring continuity mechanism of the present invention. It is this mechanism that causes the transmitters to revert back to normal operation (assuming revertiveness is provisioned in the particular virtual channel) when a fault is removed from the ring network 10. In the preferred implementation of the invention, there is a single master ring continuity node. For example, in the SONET ADM system shown in the prior figures, node N0 could be the master node. The remaining nodes in the network are considered the slave nodes. The master node controls the detection of ring continuity and the assertion of ring continuity messaging to the slave nodes. It does this by continuously transmitting special continuity protocol packets into the data stream that circles the ring network. If those packets fail to return on the same data path, then there is no ring continuity—i.e. a fault has occurred. If, however, those protocol packets return on the same data path, then there is a continuous ring connection. By continuously sensing this condition and transmitting special protocol signaling packets to the slave nodes, each slave node can know whether or not the ring is continuous.

Assuming at first a continuous ring (no fault), the nodes 12 are in the continuous ring state 92. However, at some point an anomaly occurs, such as a cable cut between nodes N5 and N4 as in FIG. 4, and an anomaly trigger is generated at those nodes. This causes the nodes on either side of the fault to enter the non-continuous ring state 94. At the same time, the master node will detect that a fault has occurred in the ring (no continuity) and will send special protocol signaling packets to all of the slave nodes so that each node knows that a fault has occurred. As long as the anomaly persists, the nodes 12 will remain in this state. Meanwhile, packets/cells are being wrapped at these nodes, and the FW indicator bits 38 are being set to cause the respective transmitter nodes to protection switch local traffic away from the fault. When the anomaly is cleared, the nodes set the anomaly dampening timer 100, which is preferably the same timer used in the wrap state machine, although it could be a separate timer. The purpose of this timer is the same as in the wrap state machine—stability of the ring network. Once the anomaly dampening timer 100 expires, the nodes enter the hold state and the wait-to-restore timer 102 is set. During the hold state, the master node is still sending messages to the slave nodes that the ring is not continuous. Like the wrap state machine, the wait-to-restore timer 102 in the ring continuity state machine is also used for stability purposes. Once this timer 102 expires, the master node starts sending protocol packets indicating that the ring is continuous, and the nodes enter the continuous ring state 92.

At this point, the various transmitter nodes are still configured to protection switch local traffic away from the faulty condition. When these nodes receive the "ring continuity" packets indicating that the fault has been removed, the VP CTL circuit 42 can then determine whether to switch 44 back so that the locally generated packets are again being routed towards the node where the fault previously existed. Whether or not the network nodes 12 will "revert" back to their prior condition depends on the design of the nodes. In some cases the nodes 12 will be provisioned with revertiveness, so that after ring continuity is asserted they will switch back to their prior operating condition. In other cases, however, the nodes will not revert, but will simply continue transmitting packets in the direction away from the prior fault. Then if a fault occurs in the new direction of transmission, and packets are wrapped back from that new direction, the VP CTL circuit 42 will again detect the FWN indicator bit 38 and will switch 44 back to the initial direction of transmission.

Another aspect of the present invention relates to the concept of garbage collection. Garbage collection in a ring network is the process of eliminating packets/cells from the data stream that, for whatever reason, are looping endlessly (or could potentially loop endlessly) in the ring. By providing the embedded feedback indicators in the overhead of the packet/cell virtual channels, the present invention provides an elegant solution to the problem of garbage collection.

Figure 7:
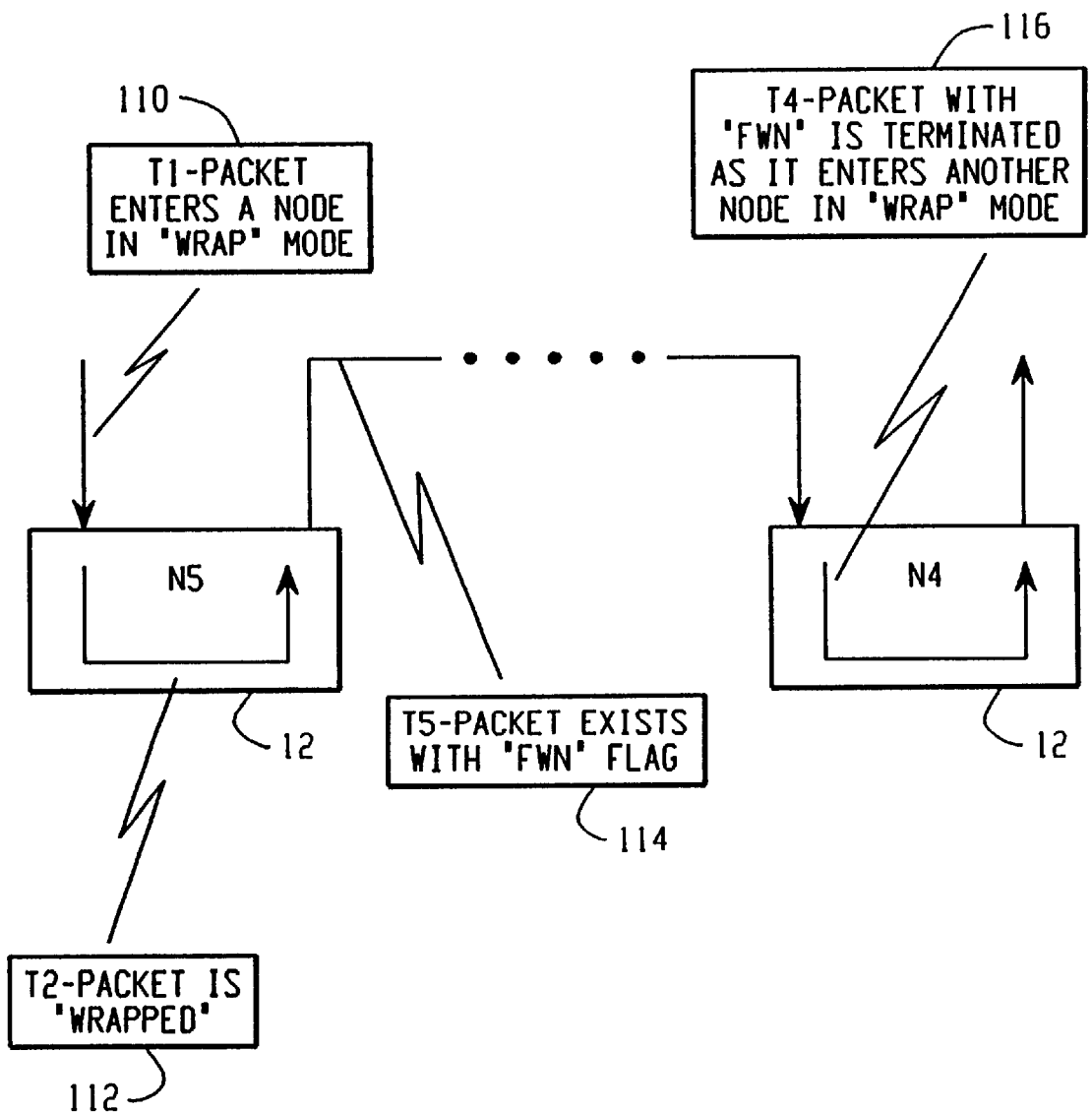
FIG. 7 is a diagram showing the preferred garbage collection function of the invention.

FIG. 7 is a diagram showing the preferred garbage collection function of the invention. In this figure, two nodes 12, N5 and N4 are both wrapping packets. This is the same situation described above where a fault occurs between these two nodes, thus engaging the wrap mechanism and path protection functions of the invention.

At time T1(110), a packet/cell enters node N5 and is wrapped back at time T2 (112) in the other direction towards N0 and ultimately towards the other nodes, including N4. At time T3 the packet exits N5 with the FWN indicator bit 38 set. The packet/cell is then transported around the ring network in the direction away from N5. At time T4 the packet enters node N4, which is also wrapping packets. If the packet is to be dropped at node N4, then it will be routed accordingly. But if it is a through packet and its FWN indicator bit 38 is already set, then the packet will be discarded. Thus, by embedding the FWN indicator 38 in wrapped packets, a simple garbage collection function is achieved with a simple rule that governs when to discard packets—if a packet enters a node which is wrapping packets in which it should pass through that node, and that packet already has its FWN indicator flag 38 set, the packet is discarded.

Finally, FIG. 8 sets forth a block diagram showing several elements of a preferred SONET add-drop multiplexer 12 incorporating the transmitter-based path protection functionality of the present invention. The preferred ADM 12 includes two transmitter/receiver ("T/R") interface circuits, an east SONET T/R agent 120, and a west SONET T/R agent, one agent for each sense of transmission on the network. The two SONET T/R agents 120 are coupled between the physical data path connections 14 and corresponding east and west Packet-Over SONET ("POS") agents 122. The POS agents 122 are, in turn, coupled to a frame relay ("FR") agent 124, which is also coupled to the local node 16 via a local node interface line 126.

The east and west SONET T/R agents 120 provide the SONET layer interfacing to the ring network 10 and also interface the SONET protocol to the POS protocol. The corresponding POS agents 122 send and receive packets from the FR agent 124 and couple them to the SONET agents 120. These POS agents 122 utilize standard POS protocol definitions for framing packets into the SONET SPE. The FR agent 124 is a higher-level agent that manages point-to-point communications over the network, setting up and tearing down the numerous virtual channels that can be created within the SONET data stream and adding/dropping packets to and from the local node connection 126. The FR agent 124 preferably includes the VP CTL circuit 42 for detecting faults in the various virtual channels, and for engaging the path protection and revertiveness functions of the associated path switch 44, which is also included in the FR agent.

The preferred embodiments of the invention described with reference to the drawing figures are presented only as examples of the present invention, which is limited only by the claims. Other elements, steps, methods and techniques that are insubstantially different from those described herein are also within the scope of the invention.

What is claimed:

1. A method of path protection switching in a ring network having a plurality of network nodes coupled together by one or more data communication paths, comprising the steps of:

detecting a faulty condition between two of the network nodes in the ring network;

engaging a wrap mechanism at the two network nodes where the faulty condition is detected in order to wrap data packets received at these nodes away from the faulty condition and back towards the transmitter network node that initially transmitted the data packets onto the ring network;

detecting the wrapped packets at the transmitter network node;

engaging a path protection switch at the transmitter network node that switches additional packets away from the faulty condition;

embedding a feedback wrap indicator flag in the wrapped packets to indicate that the packets have been wrapped by one of the two network nodes where the faulty condition is detected; and examining the wrapped packets at the transmitter node to determine whether the feedback wrap indicator flag is set, and if so, then engaging the path protection switch at the transmitter node.

2. The method of claim 1, further comprising the steps of:

embedding a virtual channel identifier into each packet transmitted onto the ring network by a particular transmitter node, wherein the virtual channel identifier uniquely identifies which network node in the ring network initiated the packet onto the ring, and also identifies the virtual channel of the packet; and examining the wrapped packets at the transmitter node to determine whether the particular transmitter initiated these packets onto the network.

3. The method of claim 2, further comprising the steps of:

sensing that the faulty condition has been removed from the data communication path coupling the two network nodes; and the transmitter nodes then switching back to the prior operational state so that additional packets are transmitted towards the prior faulty condition.

4. The method of claim 1, further comprising the steps of:

receiving packets at a network node that is configured to wrap packets away from a faulty condition; and if the feedback wrap indicator flag of the received packets is already set, then discarding the received packets.

5. Thee method of claim 3, wherein the sensing step further comprises the steps of:

providing a master network node that continuously tests the ring network's continuity to determine whether a faulty condition exists on one of the data communication paths; and transmitting ring continuity protocol packets from the master network node to the other network nodes in the ring network, wherein the ring continuity protocol packets indicate whether a faulty condition exists.

6. A method of path protection switching in a ring network, comprising the steps of:

Detecting a failure at a first network node in the ring network;

setting a forward wrap notification indicator in the overhead section of each packet received at the first network node;

wrapping the received packets away from the failure and back towards a second network node that initiated the packets onto the ring network;

detecting the wrapped packets at the second network node; and switching the transmitter of the second network node so that additional packets are transmitted away from the first network node where the failure exists.

7. The method of claim 6, further comprising the steps of:

embedding virtual channel identification information into each packet initiated onto the ring network by the second network node; and the second network node only switching its transmitter for those packets associated with virtual channels initiated by the second network node.

8. The method of claim 6, further comprising the steps of:

the second network node determining that the failure has been corrected; and switching its transmitter so that additional packets are transmitted back in the direction towards the prior failure.

9. The method of claim 8, wherein the second network node determines that a failure has been corrected according to the following steps:

providing a master network node that continuously tests the ring continuity of the ring network and transmits ring continuity protocol packets to each of the other network nodes; and receiving the ring continuity protocol packets at the second network node and determining whether the ring is continuous.

10. A system for path protection switching in a ring network having a plurality of network nodes coupled together by one or more data communication paths, comprising:

a detector in each of two network nodes for detecting a faulty condition between the nodes;

a wrap controller in each of the two network nodes for engaging a wrap mechanism when the faulty condition is detected in order to wrap data packets received at these nodes away from the faulty condition and back towards a transmitter network node that initially transmitted the data packets onto the ring network;

a detector at the transmitter network node for detecting the wrapped packets; and a path protection controller at the transmitter network node that switches additional packets away from the faulty condition, wherein the plurality of network nodes include add-drop multiplexers that include:

a frame relay agent including the wrap controller and the path protection controller;

a packet-over SONET agent coupled to the frame relay agent for encapsulating packet data into the SONET payload envelope; and a transmitter/receiver agent for transmitting and receiving the SONET payloads onto the ring network.

11. A system for path protection switching in a ring network having a plurality of network nodes coupled together by one or more data communication paths, comprising:

a detector in each of two network nodes for detecting a faulty condition between the nodes;

a wrap controller in each of the two network nodes for engaging a wrap mechanism when the faulty condition is detected in order to wrap data packets received at these nodes away from the faulty condition and back towards a transmitter network node that initially transmitted the data packets onto the ring network;

a detector at the transmitter network node for detecting the wrapped packets; and a path protection controller at the transmitter network node that switches additional packets away from the faulty condition wherein the path protection controller includes a virtual path controller and a local switch.

12. A system for path protection switching in a ring network having a plurality of network nodes coupled together by one or more data communication paths, comprising:

a detector in each of two network nodes for detecting a faulty condition between the nodes;

a wrap controller in each of the two network nodes for engaging a wrap mechanism when the faulty condition is detected in order to wrap data packets received at these nodes away from the faulty condition and back towards a transmitter network node that initially transmitted the data packets onto the ring network;

a detector at the transmitter network node for detecting the wrapped packets; and a path protection controller at the transmitter network node that switches additional packets away from the faulty condition, wherein the wrap controller-embeds a feedback indicator flag into the wrapped packets to indicate that the packets have been wrapped away from a faulty condition.

13. A system for path protection switching in a ring network having a plurality of network nodes coupled together by one or more data communication paths, comprising:

a detector in each of two network nodes for detecting a faulty condition between the nodes;

a wrap controller in each of the two network nodes for engaging a wrap mechanism when the faulty condition is detected in order to wrap data packets received at these nodes away from the faulty condition and back towards a transmitter network node that initially transmitted the data packets onto the ring network;

a detector at the transmitter network node for detecting the wrapped packets; and a path protection controller at the transmitter network node that switches additional packets away from the faulty condition, wherein the path protection controller embeds a virtual channel indicator into each packet that is initiated onto the ring network by the particular transmitter network node so that if the packets are wrapped by another node, the transmitter network node can determine which packets to protection switch.

14. The system of claim 12, wherein the feedback indicator flag is embedded into the overhead section of the packet.

15. A system for path protection switching in a ring network having a plurality of network nodes coupled together by one or more data communication paths, comprising:

a detector in each of two network nodes for detecting a faulty condition between the nodes;

a wrap controller in each of the two network nodes for engaging a wrap mechanism when the faulty condition is detected in order to wrap data packets received at these nodes away from the faulty condition and back towards a transmitter network node that initially transmitted the data packets onto the ring network;

a detector at the transmitter network node for detecting the wrapped packets;

a path protection controller at the transmitter network node that switches additional packets away from the faulty condition;

a master ring continuity detector node that continuously senses whether a faulty condition exists on the ring network, and transmits ring continuity status packets to each of the other network nodes; and wherein the path protection controller reverts back to its prior switching state when the master node transmits ring continuity status packets that indicate that the fault condition has been corrected.

16. A method of discarding packets in a ring network, comprising the steps of:

(a) detecting an anomalous condition between two nodes in the ring network;

(b) if an anomaly is detected, then setting a wrap indicator flag in packets received at the two nodes and wrappping those packets away from the anomaly; and (c) if a packet having a wrap indicator flag set is received at a node that is wrapping packets away from an anomaly, then discarding those received packets.

* * * * *

UNITED STATES PATENT AND TRADEMARK OFFICE
CERTIFICATE OF CORRECTION

PATENT NO. : 6,594,232 B1
DATED : July 15, 2003
INVENTOR(S) : Dupont

It is certified that error appears in the above-identified patent and that said Letters Patent is hereby corrected as shown below:

Column 11,
Line 26, change "Thee" to -- The --

Signed and Sealed this

Seventh Day of October, 2003

JAMES E. ROGAN
*Director of the United States Patent and Trademark Office*